United States Patent
Dudouyt

[15] 3,666,035
[45] May 30, 1972

[54] SPORTS VEHICLE STEERED BY INCLINATION OF DRIVER'S BODY

[72] Inventor: Jean Paul Antoine Dudouyt, Route d'Oix, Labenne (Landes), France

[22] Filed: Oct. 27, 1969

[21] Appl. No.: 869,459

[30] Foreign Application Priority Data

Oct. 25, 1968    France.....................................171531

[52] U.S. Cl...............................180/25 A, 180/26 R, 180/74
[51] Int. Cl................B62d 15/00, B62d 61/00, B62k 15/00
[58] Field of Search................................180/25, 25 A, 26, 74

[56] References Cited

UNITED STATES PATENTS 2,578,886    12/1951    Isherwood et al.........................180/74

3,100,020    8/1963    Sonntag................................180/25 A

FOREIGN PATENTS OR APPLICATIONS 1,292,285    3/1961    France..................................180/25 A Primary Examiner—Drayton E. Hoffman
Attorney—Edwin E. Greigg

[57] ABSTRACT

The invention relates to a three-wheeled power-driven vehicle wherein a motor driven frictional driving member is brought into engagement with a ground engaged traction wheel with steering of the vehicle being accomplished by the driver thereof leaning laterally toward one side or the other of the vehicle.

9 Claims, 7 Drawing Figures

Patented May 30, 1972
3,666,035
2 Sheets-Sheet 1
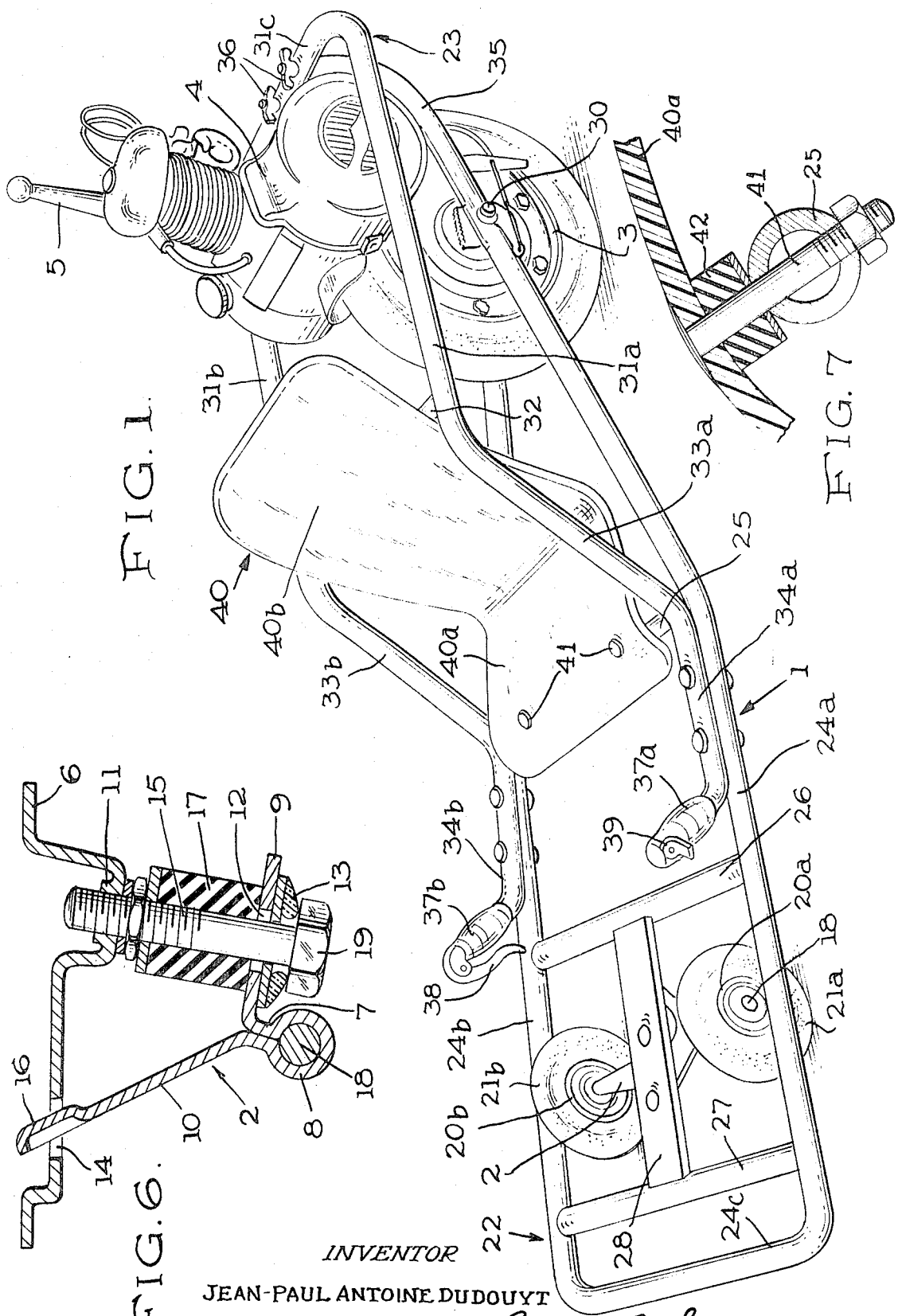
INVENTOR
JEAN-PAUL ANTOINE DUDOUYT
BY Edwin E. Greigg
ATTORNEY Patented May 30, 1972
3,666,035
2 Sheets-Sheet 2
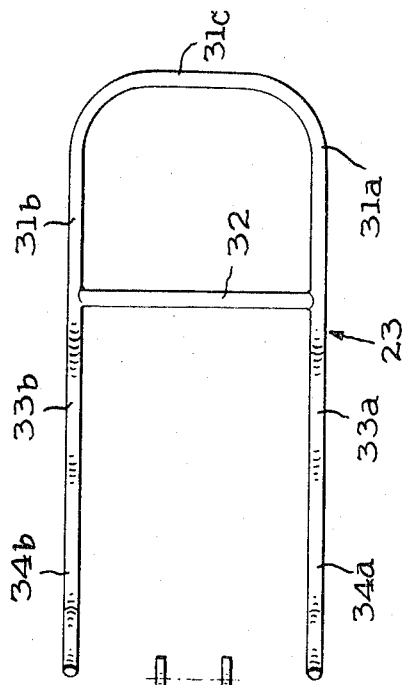
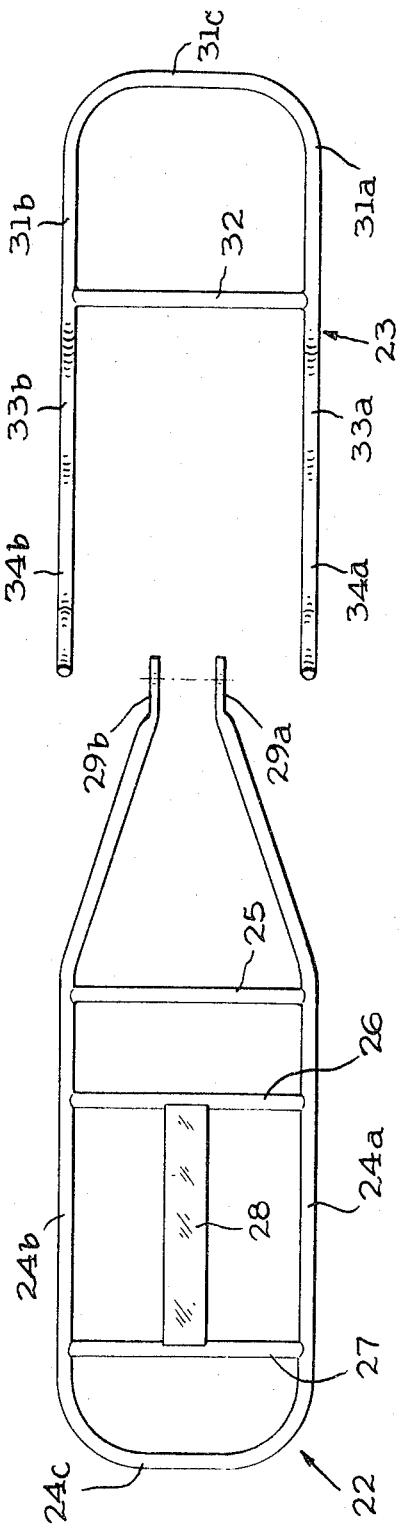
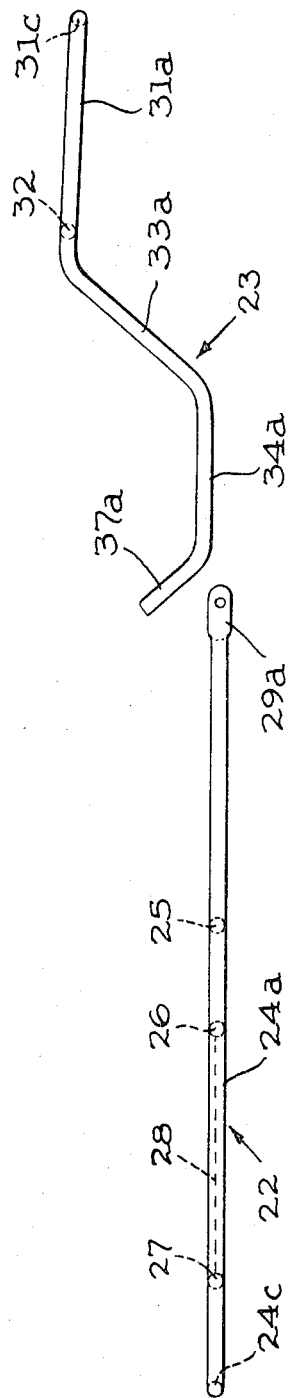
INVENTOR
JEAN-PAUL ANTOINE DUDOUYT
BY Edwin E. Greigg
ATTORNEY

SPORTS VEHICLE STEERED BY INCLINATION OF DRIVER'S BODY

The principal object of this invention is to provide a new vehicle with simplified construction which can be made at low cost, and drivable by anyone, even without prior experience.

The vehicle is remarkable in that it is composed of a chassis supported, on the one hand, at one of its extremities with a driving wheel of the type permitting the said chassis to take a certain inclination with regard to the plane of rolling motion and, on the other hand, at the other extremity by a directing running gear in which the orientation of the wheels is obtained by lateral chassis inclination with regard to the plane of rolling movement.

The inventor prefers a single rear wheel and a rearwardly mounted motor driving therethrough.

The chassis is of the tubular type and is composed, on the one hand, of a principal horizontal frame formed of two laterally disposed side members, located toward the front and middle of the frame with the rear of said frame members being composed of a fork to receive the axle of the motorized wheel, and, on the other hand, a second frame, whose rear part is made with removable means provided with a fork for receiving the engine block mounts, the extremities of the branches of said fork destined to be crossed by the wheel's axle, and the lateral side members of which are bent and fixed, for example, with nuts and bolts at their forward extremity to the mid part of the first frame, while the base of the directing rolling wheels is fixed under a platform disposed following the plane of symmetry of the chassis between two cross-pieces on the principal frame and finally with a driver's seat constituted by a shell which is sufficiently rigid, the seat portion of which rests on a cross-bar of the first frame and the back rest is connected to the cross-bar of the second frame and is firmly fixed to at least one of these cross-bars.

The chassis is easily disassemblable into two small handy pieces.

The motor block comprises, in known fashion, a driving roller and is preferably mounted pivotally on the motor in such a way that the roller can be at will put into gear with the motorized wheel or contrarily removed from the wheel while starting the engine.

The forward extremities of the second frame can be bent upwardly to allow for two manual controls, notably a hand brake and a hand-operated acceleration control.

Another characteristic is that the back rest is supported freely against the cross-bar of the second frame, while the seat portion thereof is fixed on the cross-bar of the first frame by two bolts which extend through rubber blocks which are provided between the cross-bar and the base of said seat.

Elasticity of these rubber blocks allows oscillation of the seat which permits sliding of the seat back against the corresponding cross-bar with elastic deformation of the bearing. Thus, a veritable suspension of the seat is realized which is added to the proper suspension of the vehicle resulting in the elasticity of the fork supporting the motor.

Further objects and advantages of the invention will become apparent from a reading of the following specification taken in conjunction with the drawings, in which:

FIG. 1 is a perspective view of the vehicle comprising the invention;

FIG. 2 is a top plan view of the principal frame portion of this invention;

FIG. 3 is a side elevational view thereof;

FIG. 4 is a top plan view of the secondary frame portion which is arranged to be attached to the first frame;

FIG. 5 is a side elevational view thereof;

FIG. 6 is a schematic view partially in cross section of the wheel train; and

FIG. 7 is a schematic view partially in cross section of a resilient securing means for attaching the vehicle seat to the vehicle chassis.

Turning now to the drawings, the invention comprises a chassis 1 supported on the forward directional wheel train 2, best shown in FIG. 6, and a rear motor wheel train 3.

A motor 4 provides propulsion through a frictional driving roller, not shown, which drives the wheel 3 of the motorized vehicle. In a known manner motor 4 may be oscillated relative to a fixed lever plate which is spaced from support wheel 3 about a perpendicular axis and in such a way that the driven roller can be brought into contact with the ground engaging wheel or shifted away from the latter by tilting of the motor block upward and backward. The oscillatory movement of the motor is accomplished by lever 5. It will be apparent that lock means, not shown, are provided to hold the motor 4 both in a position out of driving engagement with the ground engaging wheel 3 for starting the same and in driving engagement therewith when traction is desired.

The wheel train 2 (FIG. 6) is of the type used on certain roller skates and for which the pivoting of the axle is obtained by lateral inclination of the chassis with regard to the plane of support under the effect of movement relative to the point of application of the weight of the user resulting in a lateral inclination of the user. These devices are well known and will only be briefly described with reference to FIG. 6 for a partial cross-section view of such a wheel train without its wheels. The wheel train 2 includes a base 6 and a rocker 7 for the wheel axle 18.

The rocker 7 is formed with a tubular part 8 arranged to support the axle 18 and it further includes an apertured plate 9 and a pivot piece 10 forming with said plate an obtuse angle. The plate 9 is mounted on the base 6 through a fixed axis comprising a bolt 15 screwed into a threaded perforation 11 in base 6 and through the aperture 12 in plate 9. For resiliency a tubular elastic block carried by bolt 15 is interposed between plate 9 and base 6. Between head 19 of the bolt 15 and the lower face of the plate is placed a washer 13 which is preferably provided with at least one convex face conforming to the description in French Pat. No. 1,489,079. Base 6 also includes an opening 14 to receive the forward tongue part 16 of pivot arm 10. Wheels 20a, 20b provided with tires 21a and 21b are mounted on axle 18.

Use of the wheel train as the steering means is classic — while displacing the point of application of the driver's weight on the vehicle inclination is rendered further possible by the fact that the said vehicle possesses a single rear wheel.

When the user varies the incline of the chassis with regard to the vertical axis, the fixed axis 15 retracts with regard to plate 9 with deformation of the resilient block 17, while at the same time the tubular part 8, and consequently axle 18, turns about the axis of perforation 14 with respect to the longitudinal axis of the base, so to speak, regarding direction of movement and the chassis starts to turn into the direction of inclination.

Note that inclination of the chassis creates similar movement of the rear wheel toward the center of the turn, so to speak, and that centrifugal force has, in the plane of said wheel, a vertical component which decreases skid while increasing adherence. Thus, one obtains an effect known to users of two-wheeled vehicles with, here, greater security due to the fact that the inclination is precisely the cause determining directional change in the front drive train.

The chassis 1 is formed of a principal frame 22 and a secondary frame 23.

The principal frame 22 — also shown in FIGS. 2, and 3 — comprises an integral bent tube formed of two parallel, horizontal lateral side members 24a, 24b, a frontal cross-bar or cross-piece 24c and converging portions having ends 29a, 29b for receiving the axle 30 of the non-steerable sole rear wheel 3. The latter is permanently in alignment with the vertical symmetry plane of the vehicle. The side members 24a, 24b are further interconnected by parallel cross-bars 25, 26 and 27. To the cross-bars 26 and 27 there is affixed a plate 28 which extends symmetrically with respect to the vertical symmetry plane of the vehicle.

The secondary frame 23 — also shown in FIGS. 4 and 5 — comprises an integral bent tube formed of two parallel, horizontal lateral side members 31a, 31b, a rear cross-bar or cross-piece 31c and two parallel, downwardly and forwardly sloping portions 33a, 33b, joined by two parallel, horizontal portions 34a, 34b which respectively terminate in upwardly turned handles 37a, 37b. The handle 37a carries a power control lever 39, while on handle 37b there is mounted a brake lever 38. The side members 31a, 31b are, just before their transition into the respective sloping portions 33a, 33b, interconnected by a cross-bar 32.

To the cross-bar 31c there is attached, by dismountable securing means 36, a tubular fork member 35, the two ends of which join the principal frame 22 at the axle 30 of the rear wheel 3.

The secondary frame 23 is attached to the principal frame by affixing — preferably by dismountable securing means — portions 34a, 34b of the secondary frame 23 on the top of respective side members 24a, 24b of the principal frame 22.

A seat 40 formed of a shell and having a base 40a and a back 40b is secured to the chassis 1 by attaching the frontal marginal portion of the base 40a to the cross-bar 25 of the principal frame 22. As seen in FIGS. 1 and 7, this attachment is effected by two bolts 41 extending through resilient (e.g., rubber) blocks 42 disposed between the cross-bar 25 and the underside of the base 40a of seat 40. The rear side of the back 40b is freely supported by the cross-bar 32 of the secondary frame 23.

After starting the motor, the user sits on the seat, his feet propped up on the forward cross-piece 24c and his body laterally restrained by portions 33a, 33b of the secondary frame 23. Then he reaches back to grasp the lever 5 and tilts the motor downwardly to engage its driven roller with the tire of the traction wheel 3. By releasing the brake control 38 and applying pressure to the accelerator control 39, movement is attained. Direction of the device is then assured by body inclination causing the chassis to incline in one direction or the other from the vertical. The vehicle may be disassembled into the principal frame 22 and the secondary frame 23, so that by unscrewing wing nuts 36, the device is then separable in three parts: frame 22 with wheel train 2 and seat 40, frame 23 and propulsion assembly including fork 35, and finally the motor 4, its bearer plates and wheel 3. By detaching the motor assembly, one can add a supplementary seat in place thereof and realize a device useful for sloping race tracks in the manner of toboggans or bobsleds.

That which is claimed is:

1. A sports vehicle comprising,
   A. a chassis including
      1. a principal frame extending substantially in a horizontal plane and having a front end and a rear end, said principal frame including
         a. two laterally disposed side members,
         b. cross-bars interconnecting said side members at their front end and their mid portion,
      2. a secondary frame secured to said principal frame and having two lateral side members each including a downwardly and forwardly sloping portion,
   B. a seat attached to said chassis between said downwardly and forwardly sloping portions of said secondary frame, said last-named portions constituting lateral restraining bars for the occupant of said seat,
   C. a directional front wheel train mounted on said principal frame in the vicinity of the front end thereof,
   D. means for changing the orientation of said directional wheel train by tilting said chassis and
   E. a sole rear wheel mounted and rotatably supported on said principal frame in the vicinity of the rear end thereof in permanent alignment with the symmetry plane of said vehicle.

2. A sports vehicle as defined in claim 1, including an engine drivingly connected to said sole rear wheel.

3. A sports vehicle as defined in claim 1, including
   A. two manually graspable handles affixed to said chassis in front of both sides of said seat, and
   B. a further cross-bar rigidly attached to said chassis in front of said seat to be firmly engaged by the feet of the driver.

4. A sports vehicle as defined in claim 3, including
   A. an engine drivingly connected to said sole rear wheel,
   B. a brake control lever mounted on one of said handles and
   C. an engine power control lever mounted on the other of said handles.

5. A sports vehicle as defined in claim 1, wherein said secondary frame has a front end and a rear end; said vehicle further includes dismountable means securing the front end of said secondary frame to the mid portion of said principal frame.

6. A sports vehicle as defined in claim 1, including
   A. a horizontal plate member affixed to said chassis and disposed symmetrically with respect to the plane of symmetry of said vehicle and
   B. a base forming part of said directional front wheel train; said base is affixed to and below said horizontal plate member.

7. A sports vehicle as defined in claim 1, wherein each lateral side member of said secondary frame has an upwardly extending portion in front of said downwardly and forwardly extending portion; said vehicle includes two manually graspable handles, one mounted on each said upwardly extending portion.

8. A sports vehicle as defined in claim 1, including a seat formed of a shell and having a base and a back; said base is mounted by securing means to a cross-bar interconnecting said side members of said principal frame; said securing means includes a plurality of bolts, each passing through a block of resilient material disposed between the underside of said base and the last-named cross-bar; said secondary frame comprises a cross-bar connecting said lateral side members of said secondary frame, said last-named cross-bar extends behind said back for a free support thereof.

9. A sports vehicle as defined in claim 1, wherein said directional front wheel train includes an axle; said vehicle further comprises means to resiliently secure said axle to said chassis for a vertical springing motion of said directional front wheel train.

* * * * *